Figure 3:
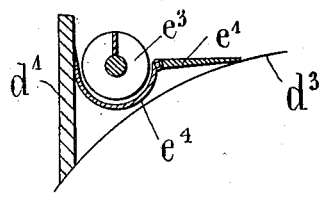

Feb. 27, 1923.
N. TESTRUP.
MANUFACTURE OF CHINA CLAY.
FILED JUNE 1, 1922.
1,446,949.
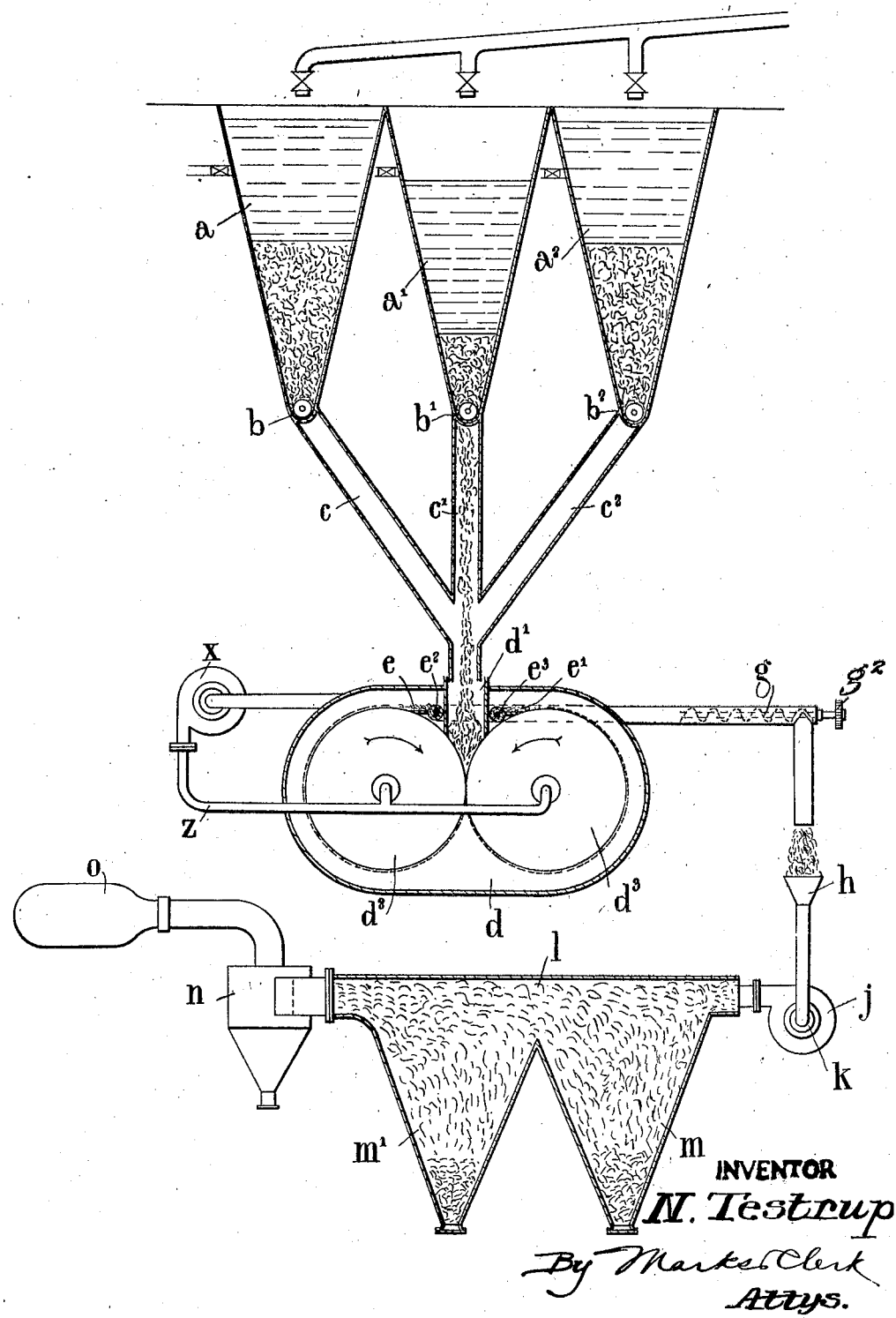

Feb. 27, 1923.

N. TESTRUP.

MANUFACTURE OF CHINA CLAY.

FILED JUNE 1, 1922.

1,446,949.

2 SHEETS—SHEET 2.

Inventor.
N. Testrup
By Marker Clerk
Atty's

Patented Feb. 27, 1923.

1,446,949

UNITED STATES PATENT OFFICE.

NILS TESTRUP, OF WESTMINSTER, LONDON, ENGLAND, ASSIGNOR TO TECHNO-CHEMICAL LABORATORIES LIMITED, OF WESTMINSTER, LONDON, ENGLAND.

MANUFACTURE OF CHINA CLAY.

Application filed June 1, 1922. Serial No. 565,250.

*To all whom it may concern:*

Be it known that I, NILS TESTRUP, a subject of the King of Great Britain and Ireland, and residing at 47, Victoria Street, Westminster, London, S. W. 1, England, have invented certain new and useful Improvements in or Relating to the Manufacture of China Clay, of which the following is a specification.

This invention relates to the removal of liquid from or the drying of china clay and may include further treatment thereof in a more or less dry state.

In many cases the washed clay having a water content of say 90% passes to settling tanks from which after various abstractions of clear water and additions of the washed clay as above, a layer some four or five feet deep of settled clay, with an average of anything from 33⅓ to 50% water, is excavated by hand and removed in buggies or trucks to the kilns or drys.

The above percentages represent averages of the complete layers of settled clay as indicated, but the water content of a settled layer will vary greatly from the top to the bottom thereof and I have found that the upper part of a layer may have a water content which is in the neighbourhood of double that of the lower part of the layer.

An object of the present invention is to introduce an improved process in which the driest clay only is taken to be further operated upon.

Another object of the invention is to effect where desired a further refinement of the clay in a simple and expeditious manner for some purposes.

The invention consists in a method of manufacturing china clay according to which clay of large water content is freed of liquid by separating methods such as settlement in a tank until a substantial layer of increased consistency is reached, after which the densest clay is removed from the precipitated layer, say by suitable conveyor or other detaching means without removal of the wetter portion, and the drying of said denser clay to any desired degree is completed upon a surface heated say by compressed evolved vapour.

The invention further consists in a method as indicated, in which a drier is continuously supplied with clay of a desired uniform consistency, say by the combined operation in sequence of a plurality of settling tanks or other continuously conducted precipitating or liquid separating operations.

The invention further consists in subjecting clay as obtained from a drier by methods as indicated to a refining treatment by carrying it as a fine powder in a moving gaseous medium, from which it is deposited in a selected condition.

The invention also consists in improvements in or relating to the manufacture of china clay, as hereinafter indicated.

The accompanying diagrammatic drawings illustrate a convenient embodiment of the invention.

Figure 2:
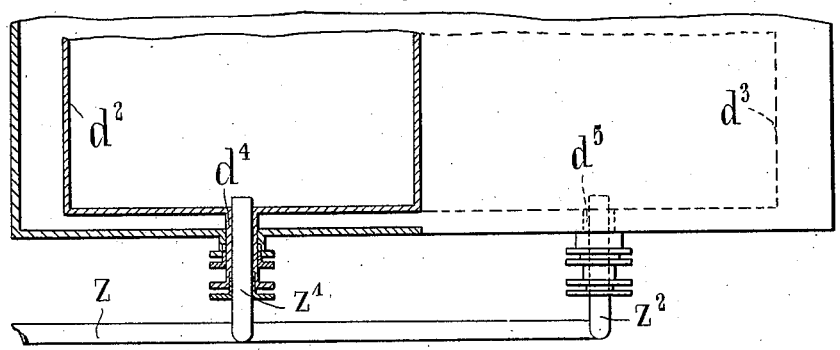
Figure 4:
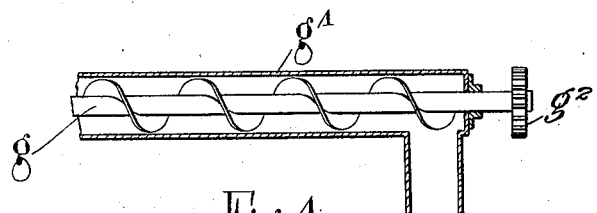

In these drawings: Figure 1 is a diagrammatic representation of apparatus for treating the wet clay and also the dried powder; Figure 2 shows to a larger scale a diagrammatic fragmental plan view partly in elevation and partly in section of one end of a drier; Figure 3 is a diagrammatic section of one of the scrapers drawn to a larger scale; Figure 4 shows to a larger scale one end of the conveyor for carrying the dried material for further treatment.

In carrying the invention into effect in the convenient form shown by way of example in the drawings, the settling tanks $a$, $a'$, $a^2$ instead of having vertical sides have their sides made sloping inwards to the bottom, so that the clay can be automatically removed from the narrow bottom of the settling tank by a conveyor $b$, $b'$, $b^2$ or other appropriate contrivance.

The series of tanks $a$, $a'$, $a^2$ are operated together in sequence, in order to obtain a continuous supply of clay, for a drum drier apparatus $d$ utilizing the compressed evolved vapour as heating medium, as described in British Patent No. 149055, or for any other continuously operated drier.

Instead of completely removing all the settled clay from one tank at a time, the operation performed upon each tank will only consist of removing the denser clay from the bottom of the settled layer thereof so that the clay of greater water content is left for further settlement as shown at $b'$.

The clay removed from the bottoms of the tanks by the conveyors $b$, $b'$, $b^2$ is of a practically uniform water content, which is the lowest that can be reached by a reasonable period of time for settling, and this clay is fed continuously by way of the conduits or chutes $c$, $c'$, $c^2$ to the hopper $d'$ of a drum drier $d$ and by passing between them is spread as a film of suitable thickness upon the drying surfaces of the two drums $d^2$, $d^3$ the dried powder being removed by the scrapers $e$, $e'$ carried by the channels $e^4$, $e^5$ through which the material is removed from the drier by the conveyor screws $e^2$, $e^3$. The vapor evolved from the film of clay is drawn from the casing $d$ through the opening $y$ and pipe $y'$ by the compressor $x$ and returned thereby at a higher pressure and temperature to the interior of the drums $d^2$, $d^3$, by the pipe $z$, said pipe having branches $z^1$, $z^2$ which enter the hollow trunnions $d^4$, $d^5$ of the drums, the evolved vapor thus acting as the heating medium after starting the apparatus in the manner well known in connection with this method of heating.

By using the densest clay only the quantity of liquid to be expelled from the films as vapour is greatly reduced and the size of drier necessary for the work is thus kept small. In addition a uniform result is obtained in this drying stage and the product from the drier may be depended upon as being of a definite known and very small water content, the water content in fact being reduced as far as may be necessary for the further use to which the product is to be put.

The product from the improved process hereinbefore described would resemble generally the ordinary product at present known as commercial china clay, but for certain purposes greater refinements are required, which heretofore have only been obtainable by treating the clay in a different manner during the settling stages.

Proposals have been made to effect this further refinement by creating what has been called "colloidal clay". This has been done by the addition of certain alkalies, which have the effect of making china clay behave as if it were colloidal, whereas the mica, quartz, feldspar and other impurities are unaffected and drop out in the presence of water. To afterwards remove the water from the colloidal clay, alum is generally added when the clay is precipitated and the water separated out. In the result a much purer clay is obtained, but a larger percentage of water, more in the neighbourhood of 60%, is retained by the clay, after the clay has been standing in the ultimate settling tanks for the usual period.

This refinement of the clay is laborious and costly and unless further operations are undertaken for thickening, filtering or otherwise separating, a larger percentage of water has to be evaporated in the drys.

According to a further feature of the present invention the refinement of the clay is effected in the dry state after it has been removed from the drum drier, the dry clay being introduced into an atmosphere of air or other gaseous material in which the heavier mica, quartz, feldspar and other impurities are allowed to separate out from the lighter china clay particles and the ultimate product therefore can be made of any desired degree of purity.

For carrying out this further feature, the dried clay removed by the conveyors $e^2$, $e^3$ is fed into and carried by another conveyor $g$ operating in a conduit $g^1$ and driven by gearing $g^2$. This conveyor delivers the clay into the hopper $h$ of a fan $j$. The dried clay may be sufficiently powdered in its transit but it may also be subjected to other disintegrating processes such as grinding or crushing if necessary, and in this powdered condition it is delivered to the fan with a suitable volume of air drawn in through the air inlet $k$ surrounding the feed pipe.

The delivery from the fan passes along a conduit $l$ beneath which a series of settling chambers $m$, $m'$ are arranged at suitable intervals, so that the heavy particles drop out by gravitation and are selected in accordance with the particular properties of each.

At its extremity the conduit $l$ enters a cyclone $n$, in which the finest solid matter is arrested, and this cyclone may be fitted upon its outlet with a bag filter $o$ if desirable.

In some cases settling chambers may be omitted and a cyclone only be employed, the speed of the air carrying the dried material being so adjusted that the heavy particles drop out at the bottom of the cyclone and only the light china clay particles and a small proportion of minor impurities are allowed to pass through to the hopper containing the finished article.

It is to be understood that the steps in the methods of operation and the apparatus therefor hereinbefore described are given by way of example only and that alterations and additions may be effected without in any way departing from the spirit of the invention.

Having now described my invention what I claim as new and desire to secure by Letters Patent is:—

1. A method of manufacturing china clay, consisting in freeing wet clay having a large liquid content of its superfluous liquid until a layer of deposited clay of smaller average liquid content varying through the layer is obtained, removing only the densest clay from the side of the layer remote from that on which the liquid has separated and feeding said densest clay in the form of a film on to a drying surface heated by a medium of which the temperature is only moderately in excess of the evaporating temperaure of the liquid still in the clay.

2. A method of manufacturing china clay, consisting in freeing wet clay having a large liquid content of its superfluous liquid until a layer of deposited clay of smaller average liquid content varying through the layer is obtained, removing only the densest clay from the side of the layer remote from that on which the liquid has separated, feeding said densest clay in the form of a film on to a drying surface heated by a medium of which the temperature is only moderately in excess of the evaporating temperature of the liquid still in the clay and transporting the resulting dried powder in a current of gaseous fluid to effect separation of various constituents in accordance with their relative weights.

3. A method of manufacturing china clay, consisting in freeing wet clay having a liquid content say in the neighbourhood of 90% of its superfluous liquid until a layer of deposited clay of an average liquid content of say of some 50% varying considerably from top to bottom of the layer is obtained, removing only the densest clay from the side of the layer remote from that upon which the liquid is separated, feeding said densest clay in the form of a film on to a drying surface by squeezing it between two rotating drying cylinders and heating said cylinders by inserting therein the vapour evolved from the film after said vapour has been subjected to compression to raise its temperature and pressure.

4. A method of manufacturing china clay, consisting in freeing wet clay having a liquid content say in the neighbourhood of 90% of its superfluous liquid until a layer of deposited clay of an average liquid content of say of some 50% varying considerably from top to bottom of the layer is obtained, removing only the densest clay from the side of the layer remote from that upon which the liquid is separated, feeding said densest clay in the form of a film on to a drying surface by squeezing it between two rotating drying cylinders, removing said clay from the drying surface with a low liquid content permitting powdering thereof and carrying said powder in a gaseous medium to effect selective separation of various constituents.

In testimony whereof I have signed my name to this specification.

NILS TESTRUP.